United States Patent
Chiba et al.

(10) Patent No.: US 8,232,697 B2
(45) Date of Patent: Jul. 31, 2012

(54) POWER UNIT

(75) Inventors: Teiichirou Chiba, Hiratsuka (JP);
Yukihiko Sugimoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 269 days.

(21) Appl. No.: 12/677,521

(22) PCT Filed: Jul. 18, 2008

(86) PCT No.: PCT/JP2008/063041
§ 371 (c)(1),
(2), (4) Date: Mar. 10, 2010

(87) PCT Pub. No.: WO2009/034781
PCT Pub. Date: Mar. 19, 2009

(65) Prior Publication Data
US 2011/0001400 A1    Jan. 6, 2011

(30) Foreign Application Priority Data

Sep. 10, 2007   (JP) .................................. 2007-234516

(51) Int. Cl.
*H02K 9/19* (2006.01)
(52) U.S. Cl. .................... 310/75 D; 310/113; 464/16
(58) Field of Classification Search .............. 310/113, 310/75 D; 74/606 A; 464/16
See application file for complete search history.

(56) References Cited

U.S. PATENT DOCUMENTS

| | | | | |
|---|---|---|---|---|
| 3,172,299 A | * | 3/1965 | Walton | 74/388 PS |
| 3,793,905 A | * | 2/1974 | Black et al. | 74/661 |
| 5,045,027 A | * | 9/1991 | Larsen | 464/63.1 |
| 5,687,612 A | * | 11/1997 | Imamura | 74/421 A |
| 8,084,908 B2 | * | 12/2011 | Chiba | 310/102 R |

FOREIGN PATENT DOCUMENTS

| JP | 05-042833 A | 2/1993 |
|---|---|---|
| JP | 10-290596 A | 10/1998 |
| JP | 2006-300101 A | 11/2006 |
| JP | 2007-006554 A | 1/2007 |

* cited by examiner

*Primary Examiner* — Burton Mullins
(74) *Attorney, Agent, or Firm* — Fish & Richardson P.C.

(57) ABSTRACT

An output shaft and an input shaft are connected with a connection member interposed therebetween, and a motor rotor is provided outside the connection member. Part of oil flowing down from an oil supply opening 11a of a motor housing MH is supplied to a first spline joint section of the input shaft and the connection member through a space and an opening of a bearing flange fixed to the motor housing MH. The oil lubricating the first spline joint section moves along an inner circumferential surface of a hole by a centrifugal force generated by rotation of the connection member, the oil moves in a radial direction along an end face on one end section side of the connection member 40 in one end section of the connection member, and the oil is supplied to a second spline joint section of the output shaft and the connection member.

15 Claims, 12 Drawing Sheets

POWER UNIT

TECHNICAL FIELD

The present invention relates to a power unit that is mounted on an automobile or a construction machine, particularly to a power unit that includes a generator motor as an auxiliary power source for a hybrid engine.

BACKGROUND ART

In the hybrid engine, a hybrid vehicle in which the generator motor is mounted on a flywheel of the engine is already put into practical use in passenger cars and commercial cars such as a bus and a truck. In the hybrid vehicle, a configuration in which the generator motor is mounted in a flywheel housing of the engine is also proposed as PTO (Power Take Off) provided in the engine.

Regardless of the hybrid vehicle, desirably components mounted on the vehicle are assembled into compact structures from the viewpoint of restriction of a vehicle installation space. Particularly, the space restriction in a shaft direction of the engine is extremely strict in the restriction of the vehicle installation space.

On the other hand, when the generator motor is mounted, generally a damper is used, in order that relative rotation accuracy between a rotor and a stator is maintained in the generator motor while an influence of a vibration or a shock is relaxed in an output shaft of the engine, and in order that the influence of the shock on drive of a hydraulic pump is relaxed. When the damper is provided in mounting the generator motor, unfortunately the space in the shaft direction of the engine is inevitably sacrificed.

Therefore, a damper function similar to the damper structure can be exerted by adopting a coupling structure of at least two spline joint sections. Additionally, the adoption of the coupling structure can compactly assemble the generator motor mounted on the output shaft of the engine. The generator motor having the compact configuration can be provided in the shaft direction of the engine to reduce the space in the shaft direction of the engine.

The inventor already proposes the configuration in which the generator motor is provided between the output shaft of the engine and an input shaft of the hydraulic pump using the coupling structure instead of the damper structure (see Patent Document 1).

FIG. 17 is a longitudinal sectional view illustrating the configuration of the generator motor described in Patent Document 1 as a conventional example 1 of the present invention. FIG. 17 is a mirror-reversed image of the drawing of Patent Document 1. As illustrated in FIG. 17, in the hybrid engine, a motor housing MH is fixed between an engine housing EH and a pump housing PH. An output shaft 101 of the engine and an input shaft 102 of the hydraulic pump are connected to each other with a cylindrical connection shaft section 140 interposed therebetween.

The output shaft 101 and the connection shaft section 140 are connected so as to be able to rotate integrally by spline joint of an internal spline 171 and an external spline 141. The internal spline 171 is formed in an inner circumferential surface of a flywheel 170 mounted on an end section of the output shaft 101, and the external spline 141 is formed in an outer circumferential surface on one end side of the connection shaft section 140. The connection shaft section 140 and the input shaft 102 are connected so as to be able to rotate integrally by spline joint of an internal spline 142 and an external spline 102a. The internal spline 142 is formed in an inner circumferential surface in the other end section of the connection shaft section 140, and the external spline 102a is formed in an outer circumferential surface of the input shaft 102.

An external spline 143 is formed in an outer circumferential surface in an intermediate section of the connection shaft section 140. The external spline 143 engages an internal spline 131a, and the spline joint is performed between the external spline 143 and the internal spline 131a. The internal spline 131a is formed in an inner circumferential surface of an annular rotor support section 131 that is of one of components of a motor rotor 130. An outer circumferential surface of the annular rotor yoke 135 mounted on the rotor support section 131 and an inner circumferential surface of the ring stator core 120 fixed to an inner wall surface of the motor housing MH are provided with a predetermined air gap.

A screw hole 140a is made in a axial center in an end face on one end section side of the connection shaft section 140, and a stepped retainer 144 is fitted in a circular recessed section formed in the end face while a spring ring 145 is interposed therebetween. The spring ring 145 and the stepped retainer 144 are fixed to the end face on one end section side of the connection shaft section 140 by screwing and tightening a tightening bolt 146 in the screw hole 140a. At this point, an outer circumferential end edge of the spring ring 145 is fitted in a ring groove section formed in an inner circumferential surface of an internal spline 171 of a flywheel 170, thereby blocking relative movement between the connection shaft section 140 and the flywheel 170.

In the configuration of the generator motor, the output shaft 101 of the engine and the input shaft 102 to which a drive force of the output shaft 101 is transmitted can be connected with the connection shaft section 140 interposed therebetween. In the connection shaft section 140, at least two spline joint points are formed. Additionally, the output shaft 101, the input shaft 102, and the connection shaft section 140 are connected by the coupling structure of the spline joint. Therefore, the transmission of a surface vibration or a core vibration and the shock to the input shaft 102 from the engine side can be relaxed by the coupling structure. The power can efficiently be transmitted from the output shaft 101 to the input shaft 102.

The motor rotor 130 of the generator motor can be mounted on the connection shaft section 140 by the spline joint so as to be able to rotate integrally. Therefore, the transmission of the surface vibration or core vibration and the shock to the motor rotor 130 from the engine side can be relaxed.

The motor rotor 130 of the generator motor is retained by the engine housing EH that is of the fixed housing while a bearing 160 is interposed therebetween, so that relative rotating accuracy can be secured between the rotor yoke 135 and stator 120 of the generator motor. Additionally, the generator motor can efficiently generate an electric power, or the generator motor can efficiently drive as a motor.

Patent Document 1: Japanese Patent Application Laid-Open No. 2007-6554

DISCLOSURE OF THE INVENTION

Problems to be Solved by the Invention

In the hybrid engine disclosed in Patent Document 1, the transmission of the surface vibration or core vibration and the shock to the side of the input shaft 102 from the engine side is relaxed by the coupling structure of the spline joint section in which spline teeth 141 and 171 engage each other and the spline joint section in which spline teeth 142 and 102a engage each other. However, in order to relax the transmission of the shock and the like to the side of the input shaft 102, it is necessary to sufficiently lubricate the spline joint section.

In order to lubricate the spline joint section, it is possible that lubricant oil is supplied from above the motor housing MH and introduced to the spline joint section. In such cases, the lubricant oil reaching the spline joint section can flow in the shaft direction through an engagement gap in the spline joint section. Additionally, because the spline-jointed shaft rotates, the lubricant oil can evenly be supplied in sequence to each of the engaging teeth.

However, in the hybrid engine described in Patent Document 1, the output shaft 101 and the input shaft 102 are connected while the spline joint sections at two pints in both end sections of the connection shaft section 140 are interposed therebetween. Therefore, it is necessary that the lubricant oil can be supplied to each of the spline joint sections at the two points.

Accordingly, oil passages that supply the lubricant oil to the spline joint sections at the two points are provided in the motor housing MH, and the oil passage configuration in which the lubricant oil is supplied to the spline joint sections at the two points becomes complicated. Further, because the space in the surroundings of the spline joint section is strictly restricted, it is difficult that the lubricant oil is simultaneously supplied to the two spline joint sections.

When the lubricant oil is supplied to one of the spline joint sections while the lubricant oil lubricating one of the spline joint sections is continuously supplied to the other spline joint section, the oil passage configuration in which the lubricant oil is supplied can be simplified. Because the screw hole 140*a* is made in the end face on one end section side of the connection shaft section 140, it is considered that the screw hole 140*a* can be used as a passage through which the lubricant oil passing through the spline joint section in which the spline teeth 142 and 102*a* engage each other is supplied to the spline joint section in which the spline teeth 141 and 171 engage each other. When the screw hole 140*a* can be used as the passage, it is not necessary to separately provide the oil passages that supply the lubricant oil to the spline joint sections at two points.

However, the screw hole 140*a* is made as the screw hole in which the tightening bolt 146 is screwed and tightened in order to fix the spring ring 145 and the stepped retainer 144 to the end face on one end section side of the connection shaft section 140. Therefore, a gap that constitutes the oil passage is not formed between the tightening bolt 146 and the screw hole 140*a*. Accordingly, it is difficult that the lubricant oil passing through the spline gap in the spline joint section in which the spline teeth 142 and 102*a* engage each other is supplied to the spline joint section in which the spline teeth 141 and 171 engage each other through the screw hole 140*a* in which the tightening bolt 146 is screwed and tightened.

It is also considered that an oblique hole pierces through the inner circumferential surface side of the connection shaft section 140 to the outer circumferential surface side as the configuration in which the lubricant oil passing through the spline gap in the spline joint section in which the spline teeth 142 and 102*a* engage each other is introduced to the outer circumferential surface side of the connection shaft section 140. It is considered that the oblique hole is made while inclined toward the spline joint section side on which the spline teeth 141 and 171 engage each other.

For the use of the configuration, part of the lubricant oil discharged through the oblique hole becomes mist while colliding with the members in the motor housing MH, and the lubricant oil can reach the spline joint section in which the spline teeth 141 and 171 engage each other.

However, when the number of revolutions increases in the connection shaft section 140 to strengthen an influence of a centrifugal force, the lubricant oil passing through the oblique hole runs further away to the outside. Therefore, in order to sufficiently supply the lubricant oil to the spline joint section in which the spline teeth 141 and 171 engage each other, it is necessary that a guide piece that guides the lubricant oil toward the spline joint section in which the spline teeth 141 and 171 engage each other is provided at an exit of the oblique hole. Accordingly, the structure becomes complicated near the spline joint section in which the spline teeth 141 and 171 engage each other.

The invention is made in order to overcome the problems in the hybrid engine. An object of the invention is to provide a power unit that can sufficiently supply the lubricant oil with a simple structure to the two spline joint sections in both the end sections of the connection shaft section that are spline-jointed to the output shaft of the engine and the input shaft to which the drive force of the output shaft is transmitted.

Means for Solving the Problems

The object of the invention is effectively achieved by a main configuration of the invention, that is, a power unit including: a connection shaft section that connects an output shaft of an engine and an input shaft to which a drive force of the output shaft is transmitted; a generator motor that is provided in an outer circumferential section of the connection shaft section, the generator motor including a rotor that rotates integrally with the connection shaft section; an external spline that is formed in parallel with a center axis direction of the connection shaft section to perform spline joint to one of the output shaft and the input shaft in an outer circumferential surface on one end section side of the connection shaft section; and an internal spline that is formed in parallel with the center axis direction of the connection shaft section to perform the spline joint to one of the input shaft and the output shaft in an inner circumferential surface on the other end section side of the connection shaft section, wherein the connection shaft section includes a hole that is communicated with a hollow recess that forms the internal spline and opened to an end face on one end section side of the connection shaft section, and an oil passage communicating the internal spline with the external spline includes the hole and a gap formed between the end face on one end section side of the connection shaft section and one of the output shaft and the input shaft.

In preferable aspect, the hole is formed as an inclined hole whose inner diameter expands toward one end section side of the connection shaft section. In preferable aspect, the inner diameter of the hole in a region communicated with the hollow recess is substantially equal to a diameter of a dedendum circle of the internal spline formed in the connection shaft section.

Further, the hole includes a plurality of continuous holes having different inner diameters, and the plurality of continuous holes can be made such that the inner diameters gradually increase toward one end section side of the connection shaft section.

Alternatively, at least one first inclined groove is formed in the hole, the first inclined groove is opened to the end face on one end section side of the connection shaft section, and a depth of the first inclined groove increases toward one end section side. The first inclined groove is formed as an inclined groove that is communicated with the end face on the other end section side of the connection shaft section.

Further, a shape of the first inclined groove in a region where the internal spline is formed is formed into the inclined groove having a width identical to a pitch width of the internal spline of the connection shaft section.

Still further, at least one second inclined groove is formed in an outer circumferential surface on one end section side of the connection shaft section, the second inclined groove is opened to the end face on one end section side of the connection shaft section, and a depth of the second inclined groove increases toward one end section side. A shape of the second inclined groove in a region where the external spline is formed is formed into the inclined groove having a width identical to a pitch width of the external spline of the connection shaft section.

Effects of the Invention

In the invention, the oil passage that communicates the spline joint section engaged with the internal spline of the connection shaft section to the spline joint section engaged with the external spline of the connection shaft section is formed by the hole made in the connection shaft section and the oil passage passing through the gap formed between the end face on one end section side of the connection shaft section and one of the output shaft and the input shaft, which face the end face on one end section side of the connection shaft section.

In the configuration, the lubricant oil that flows into the hole after evenly lubricating the spline joint section engaged with the internal spline of the connection shaft section can flow out toward one end section side of the connection shaft section along the inner circumferential surface of the hole by a centrifugal force of the rotating connection shaft section. The flowing-out lubricant oil is supplied to the spline joint section engaged with the external spline of the connection shaft section through the gap formed between the end face on one end section side of the connection shaft section and one of the output shaft and the input shaft, which face the end face on one end section side of connection shaft section, by the centrifugal force of the rotating connection shaft section.

The lubricant oil that is supplied to the spline joint section engaged with the external spline of the connection shaft section can flow in the axial direction of the connection shaft section after evenly lubricating the spline joint section engaged with the external spline of the connection shaft section.

Thus, in the invention, a large amount of lubricant oil can smoothly be supplied to the two spline joint sections by utilizing the centrifugal force of the rotating connection shaft section. Additionally, when the lubricant oil is supplied from the upper section of the housing to one of the spline joint sections, because the lubricant oil is automatically supplied to the other spline joint section, the oil passage through which the lubricant oil is supplied from the upper section of the housing to the spline joint sections can be formed by one oil passage. Therefore, the configuration of the oil passage through which the lubricant oil is supplied from the upper section of the housing to the spline joint sections becomes simplified.

In the configuration of the connection shaft section, the connection shaft section can be supported by the engine housing, the motor housing, or the pump housing while the bearing is interposed therebetween. Therefore, a degree of freedom of design can be enhanced in the design of the oil passage through which the lubricant oil is supplied from the upper section of the motor housing to the spline joint sections. Because the connection shaft section is supported by the housing while the bearing is interposed therebetween, the movement in the axis direction of the connection shaft section can be controlled.

In the configuration of the invention, because the connection shaft section can be supported by the housing, the spring ring 145 used to block the relative movement between the connection shaft section 140 and the flywheel 170 is eliminated, and the screw hole 140a in which the tightening bolt 146 is screwed is also eliminated in the generator motor of the conventional example. Therefore, the hole of the invention can be formed in the region where the screw hole 140a is made.

The hole can be made as the inclined hole whose inner diameter expands toward one end section side of the connection shaft section. Therefore, the oil in the rotating connection shaft section flows toward one end section side of the connection shaft section along the inner circumferential surface of the hole by the action of the centrifugal force. Accordingly, a larger amount of oil can flow in the hole, and the lubricant oil can sufficiently be supplied to the two spline joint sections.

The inner diameter of the hole on the side opposite to one end section side of the connection shaft section can substantially be equal to a diameter of the dedendum circle of the internal spline formed in the connection shaft section. Therefore, the hole can be made as the inclined hole whose diameter increases, and a large amount of oil can flow in the hole.

As to the shape of the hole, the hole can be made as a plurality of holes having different inner diameters, and the plurality of holes are made such that the inner diameters gradually increase toward one end section side of the connection shaft section. Therefore, as with the configuration in which the hole is made as the inclined hole whose inner diameter expands, a large amount of oil can flow in the stepped hole by utilizing the centrifugal force. Additionally, the stepped hole can be produced for a shorter time at low cost by simple cutting work compared with the inclined hole whose inner diameter expands.

At least one first inclined groove in which the inclination is provided can be formed in the hole. A larger proportion of oil flowing along the inner circumferential surface of the hole can flow in the first inclined groove by utilizing the centrifugal force obtained by the rotation of the connection shaft section. Thus, the first inclined groove can be formed in the hole to effectively utilize the centrifugal force to the oil flowing in the first inclined groove.

Even if the inclined hole whose inner diameter expands or the stepped hole having a plurality of different diameters is not made as the hole, the first inclined groove can simply be formed in the hole that is made as the simple drilled hole. Additionally, the oil flowing along the inner circumferential surface of the hole is also trapped in the first inclined groove, so that a large amount of lubricant oil can flow in the first inclined groove.

In the hole made as the drilled hole, a cutting amount in providing the first inclined groove is smaller than a cutting amount in cutting the inclined hole whose inner diameter expands or a cutting amount in cutting the stepped hole having the plurality of different diameters. For example, even if the end face on one side of the connection shaft section does not have the sufficiently large outer diameter, the drilled hole having the small inner diameter can be made as the hole, and the first inclined groove is formed in the hole. Therefore, the amount of oil flowing in the hole can increase without degrading rigidity of the connection shaft section itself.

The first inclined groove can also be formed in the inclined hole whose inner diameter expands or the stepped hole having the plurality of different diameters. As to the position in which the first inclined groove is disposed, desirably at least a pair of first inclined grooves is disposed in regions that are symmetrical in relation to the center axis of the connection shaft section in order not to lose a rotating balance of the connection shaft section.

The first inclined groove is formed as the inclined groove that communicates the end face on one end section side of the connection shaft section to the end face on the other end section side, which allows the action of the centrifugal force to be easily applied to the oil passing through spline joint section on the other end section side of the connection shaft section. Therefore, a large amount of oil can pass through the spline joint section.

As to the shape of the first inclined groove in the region where the internal spline of the connection shaft section is formed, the first inclined groove can be formed as an inclined groove in which part of the internal spline is lost or an inclined groove having a width identical to a pitch width in a bottom surface of the internal spline.

At least one second inclined groove can be formed in the region where the external spline of the connection shaft section is formed. When the second inclined groove is formed, the spline joint section engaged with the external spline of the connection shaft section can evenly be lubricated by utilizing the centrifugal force generated by the rotation of the connection shaft section. The oil can flow out to the outside of the connection shaft section after the lubrication.

As to the position in which the second inclined groove is disposed, desirably at least a pair of second inclined grooves is disposed in regions that are symmetrical in relation to the center axis of the connection shaft section in order not to lose the rotating balance of the connection shaft section that is of the rotating body. When both the first inclined groove and the second inclined groove are formed, for example, the two first inclined grooves can vertically be provided while the two second inclined grooves are horizontally provided.

Therefore, that the residual thickness on one end section side of the connection shaft section decreases by interference between the first inclined groove and the second inclined groove to degrade the rigidity of the connection shaft section can be prevented. Additionally, the first inclined grooves and the second inclined grooves can be formed such that the rotating balance of the connection shaft section is not lost.

The rotating balance of the connection shaft section that is of the rotating body is not lost, and the degradation of the rigidity of the connection shaft section itself is prevented. Therefore, desirably the first inclined grooves and the second inclined grooves are disposed symmetrical about the center axis of the connection shaft section, and the circumferential dispositions of the first inclined grooves and the second inclined grooves are also considered such that first inclined groove and the second inclined groove do not interfere with each other.

As to the shape of the second inclined groove, the second inclined groove can be formed as an inclined groove in which part of the external spline is lost in the connection shaft section or an inclined groove having a width identical to the pitch width in the bottom surface of the internal spline.

EXPLANATION OF REFERENCE NUMERALS

Figure 1:
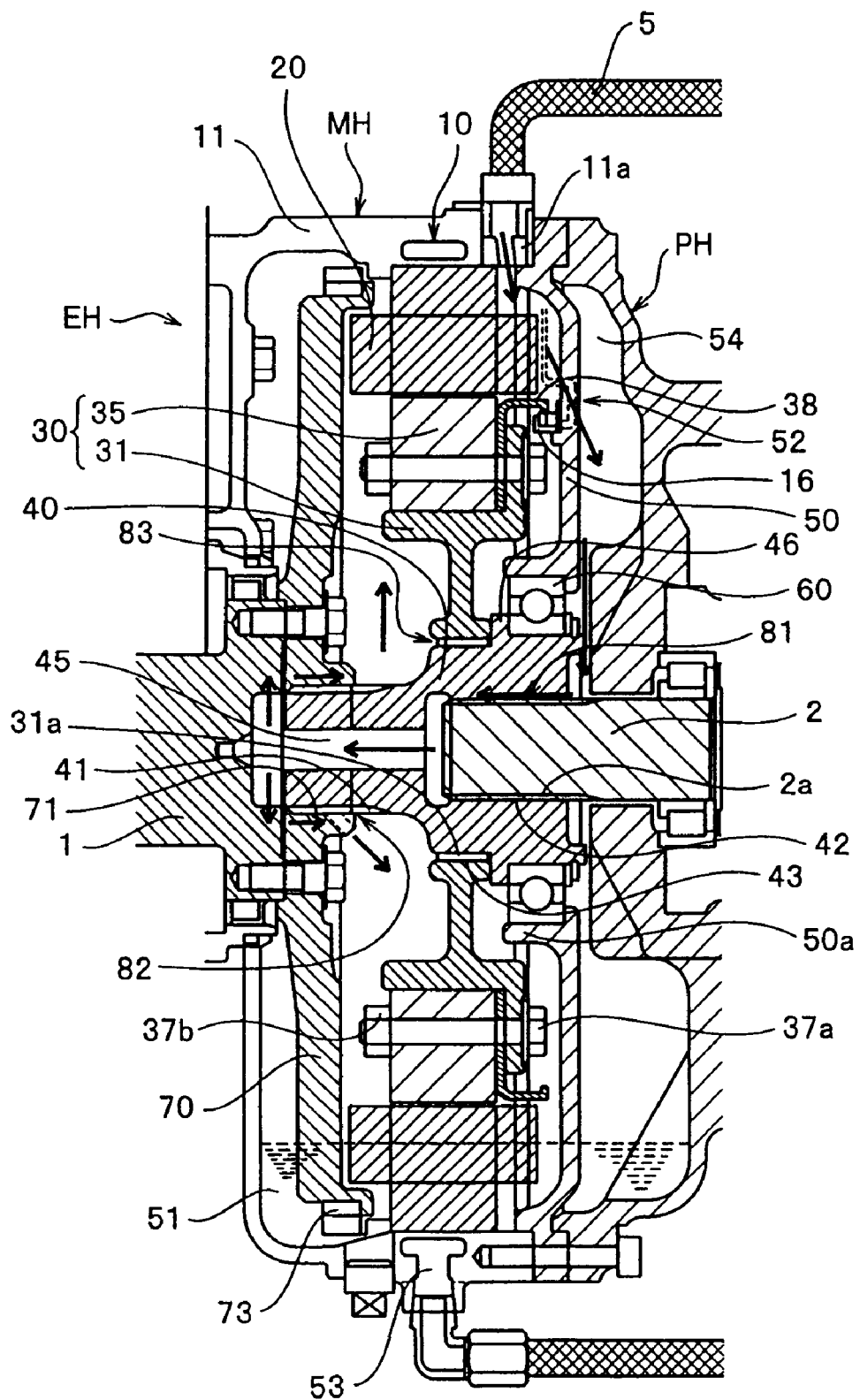
FIG. 1 is a longitudinal sectional view of a generator motor (embodiment)

1 Output shaft
2 Input shaft
10 Generator motor
11 Housing body
11a Oil supply opening
20 Stator core
30 Motor rotor
31 Rotor support section
35 Rotor yoke
38 Impeller
40 Connection shaft section
41 First external spline
42 Internal spline
43 Second external spline
45 Hole
50 Bearing flange
51 Oil reservoir
52 Opening
55 First inclined groove
56 Second inclined groove
59 Bearing flange
70 Flywheel
75 Gear member
81 First spline joint section
82 Second spline joint section
83 Third spline joint section 101 Output shaft
102 Input shaft
120 Stator core
130 Motor rotor
131 Rotor support section
135 Rotor yoke
140 Connection shaft section
141 External spline
142 Internal spline
143 External spline
145 Spring ring
170 Flywheel

BEST MODE FOR CARRYING OUT THE INVENTION

An exemplary embodiment of the present invention will specifically be described with reference to the drawings. FIG. 1 is a longitudinal sectional view passing through an axis line of a generator motor according to an embodiment of the invention. FIGS. 2 to 5 are perspective views of main components of the generator motor. The generator motor of the embodiment is mounted on a hybrid engine applied to a construction machine such as a hydraulic shovel by way of example. However, generator motor of the embodiment can widely be applied to other automobile fields, a general industrial machine field, and large-size engines such as a ship.

As illustrated in FIG. 1, a motor housing MH in which a generator motor 10 is accommodated is fixed between an engine housing EH and a pump housing PH. The engine housing EH and pump housing PH are integrally fixed to each other with the motor housing MH interposed therebetween.

In the engine housing EH, an output shaft 1 directly connected to an engine (not illustrated) is journaled in a bearing. In the pump housing PH, an input shaft 2 directly connected to an input shaft 2 of a hydraulic pump (not illustrated) or a transmission (not illustrated) is journaled in a bearing.

A ring stator core 20, a motor rotor 30, and a connection shaft section 40, which constitute the generator motor 10, are provided in the motor housing MH. The stator core 20 is fixed to an inner wall surface of the motor housing MH. The motor rotor 30 is located across an air gap from an inner circumferential surface of the stator core 20, and the motor rotor 30 can be rotated integrally with the connection shaft section 40 while supported by the connection shaft section 40.

The connection shaft section 40 is journaled in the motor housing MH with a bearing 60 interposed therebetween, and a first external spline 41 is formed in an outer circumferential surface on one end section side of the connection shaft section 40. An internal spline 42 is formed in an inner circumferential surface on the other end section side of the connection shaft section 40, and a second external spline 43 in an outer circumferential surface in an intermediate section of the connection shaft section 40.

An outer race of the bearing 60 is fitted in a bearing flange 50 while interposed between the motor housing MH and the pump housing PH. An inner race of the bearing 60 is fitted in a fitting section 40a (see FIG. 6) of the connection shaft section 40. A cylindrical section 50a is formed in the bearing flange 50, and the outer race of the bearing 60 is fitted in a central section of the cylindrical section 50a.

A flywheel 70 is fixed to the output shaft 1 projected from the engine housing EH into the motor housing MH, and an internal spline 71 is formed in an inner circumferential surface of the flywheel 70. An external spline 2a is formed in an outer circumferential surface of the input shaft 2 projected from the pump housing PH into the motor housing MH.

The internal spline 42 on the other end section side of the connection shaft section 40 engages the external spline 2a of the input shaft 2 to form a first spline joint section 81. The first external spline 41 on one end section side of the connection shaft section 40 engages the internal spline 71 of the flywheel 70 to form a second spline joint section 82. The second external spline 43 of the connection shaft section 40 engages an internal spline 31a to form a third spline joint section 83. The internal spline 31a is formed in an inner circumferential surface of a rotor support section 31 constituting the motor rotor 30.

The connection shaft section 40 and the output shaft 1 are spline-jointed to each other with the flywheel 70 interposed therebetween, and the connection shaft section 40 is journaled in the motor housing MH with the bearing 60 interposed therebetween. Therefore, the bearing 60 blocks the movement of the connection shaft section 40 in an axis direction of the output shaft 1.

The motor rotor 30 includes the rotor support section 31 and a ring rotor yoke 35 that is supported by the outer circumferential surface of the rotor support section 31 while being in close contact with the outer circumferential surface of the rotor support section 31. As described above, the rotor support section 31 is spline-jointed to the second external spline 43 formed in the intermediate section of the connection shaft section 40 in the third spline joint section 83.

The flywheel 70 fixed to the output shaft 1 has not only a function of enhancing rotation efficiency of the engine but also a function of enhancing electric generation efficiency and motor efficiency in the generator motor 10. Therefore, the flywheel 70 acts as both a component on the engine side and a component of the generator motor 10.

A starter ring gear 73 is fixed to an outer circumferential section of the flywheel 70, and an engine starter gear function can be imparted to the starter ring gear 73. In starting up the engine, the generator motor 10 can be activated as a motor. Therefore, when the generator motor 10 is activated as the engine starting motor, the starter ring gear 73 can have the function of starting the generator motor 10.

In order to improve engine starting property in a cold district, more preferably a conventional starter is separately placed, and the conventional starter is activated in cooperation with the starter ring gear 73.

The configuration in which the flywheel 70 is used is described in the embodiment. Alternatively, an internal spline (not illustrated) is formed in the output shaft 1, and the internal spline of the output shaft 1 and the first external spline 41 of the connection shaft section 40 may be spline-jointed with no use of the flywheel 70.

As method for spline-joining an internal spline (not illustrated) of the connection shaft section 40 and an external spline (not illustrated) of the flywheel 70 while spline-joining an external spline (not illustrated) of the connection shaft section 40 and an internal spline (not illustrated) of the input shaft 2 may be adopted as the method for spline-joining the first spline joint section 81 and the second spline joint section 82.

Figure 6:
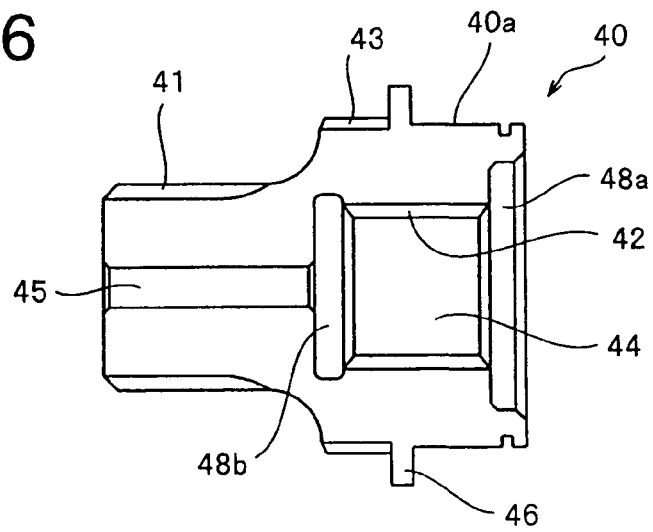
FIG. 6 is a longitudinal sectional view of a connection shaft section (embodiment)

As illustrated in FIG. 6, a hole piercing through an axis center of the connection shaft section 40 is made in the connection shaft section 40 while a hole 45 is communicated with a hollow recess 44 in which the internal spline 42 is formed. Referring to FIG. 6, a region designated by the reference numeral 40a is a fitting section in which the inner race of the bearing 60 is fitted.

As described later, the hole made in the axis center of the connection shaft section 40 can be formed into sectional shapes of FIGS. 7 to 14 in addition to the sectional shape of FIG. 6.

A configuration of the motor housing MH will be described with reference to FIGS. 1 and 2. A housing body 11 of the motor housing MH is formed into a thin cylindrical shape as a whole. Therefore, even if the generator motor 10 is mounted in the shaft direction of the engine, it is not necessary to increase a length in the shaft direction of the engine.

An oil supply opening 11a is formed in an upper wall section of the motor housing MH, and a pipe 5 is connected to the oil supply opening 11a to supply the oil that acts as both the lubricant oil and cooling oil. The oil flowing down from the oil supply opening 11a is supplied to a blade section of an impeller 38 mounted on the rotor support section 31, and the oil flows into a space 54 formed between the bearing flange 50 and the pump housing PH through an opening 52 formed in the bearing flange 50.

The space 54 is communicated with the first spline joint section 81 in which the internal spline 42 of the connection shaft section 40 and the external spline 2a of the input shaft 2 are spline-jointed. Alternatively, a pipe communicated with the oil supply opening 11a is provided in the motor housing MH without forming the space 54, part of the oil flowing down from the oil supply opening 11a is directly taken out by the pipe, and the first spline joint section 81 is sprayed with the oil taken out by the pipe.

According to the configuration, the oil flowing into the space 54 can be supplied to the first spline joint section 81. An oil reservoir 16 is mounted on the bearing flange 50, and part of the oil that flows down from the oil supply opening 11a to be supplied to the impeller 38 can be reserved in the oil reservoir 16.

The impeller 38 is rotated along with the rotation of the motor rotor 30, and a circumferential surface section of the impeller 38 receives the oil flowing down from the oil supply opening 11a to retain the oil between projected strips (blades) that are projected in a circumferential direction of the outer circumferential surface at predetermined pitch. The oil retained between the strips (blades) by the centrifugal force during the rotation and the oil reserved in the oil reservoir 16 can be scraped up by the rotation of the impeller 38. The oil scraped up by the impeller 38 is sprinkled in the stator core 20 provided around the impeller 38.

Figure 5:
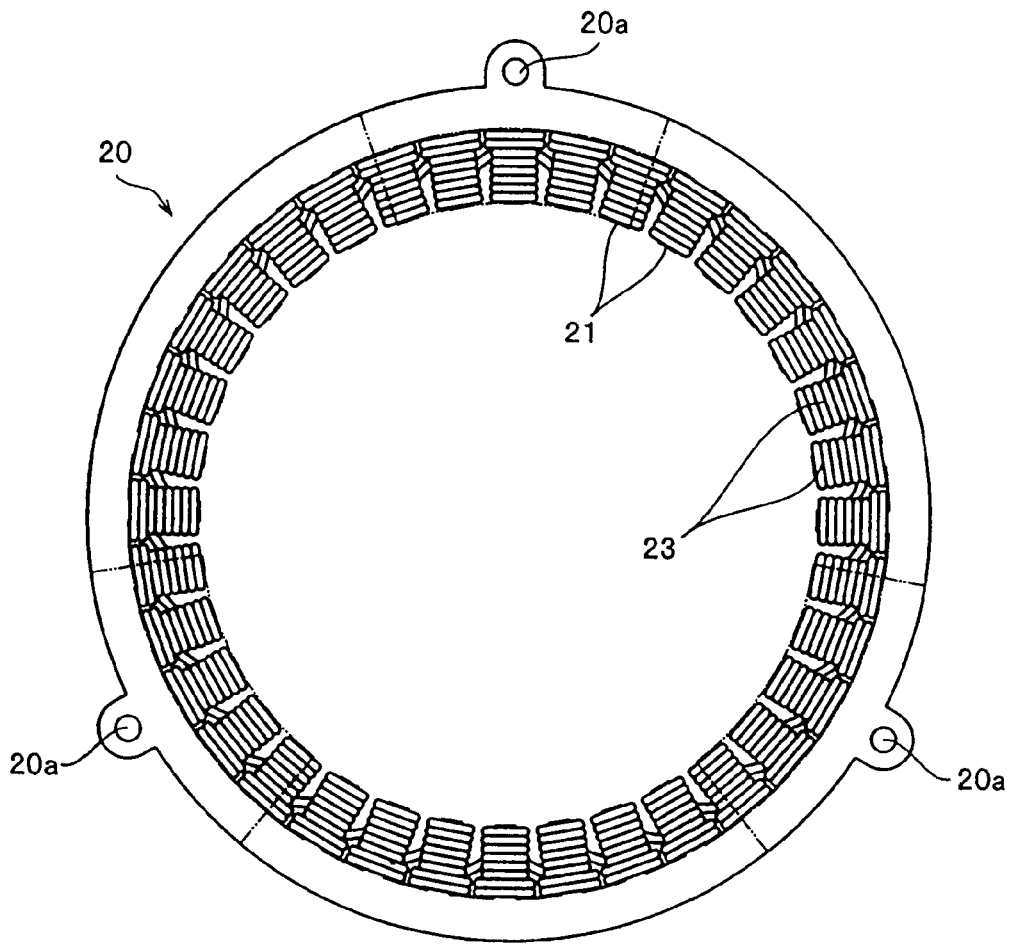
FIG. 5 is a plan view of a stator core (embodiment)

As illustrated in FIG. 5, the stator core 20 is formed by a ring member, protrusions 21 that constitute many poles are protruded toward the center at predetermined pitch in a circumferential direction in the inner circumferential surface of the stator core 20. Three coils 23 are sequentially wound around the circumferential surface of the protrusions 21 by a usual method.

In the embodiment, the protrusions 21 including a total of 36 protrusions are formed to constitute a 3-phase, 12-pole SR motor. Six coil terminals in both end sections of the three coils 23 are inserted in terminal connection sections (not illustrated) formed in a circumferential surface of the housing body 11. The six coil terminals are connected to terminals of leads (not illustrated) extended from an external alternating-current power supply through the terminal connection sections.

Figure 2:
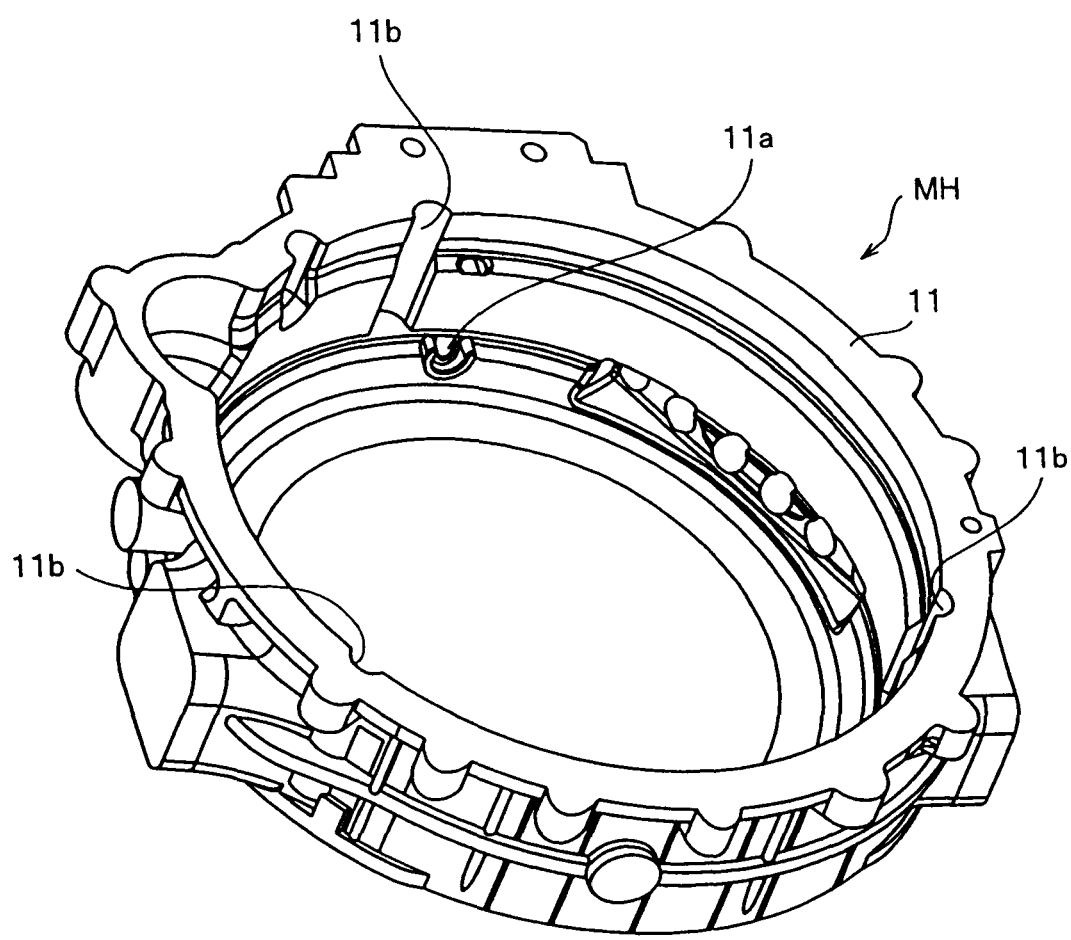
FIG. 2 is a perspective view of a motor housing when viewed from an engine side (embodiment)

Three projections 20a are formed in an outer circumferential section of the stator core 20, and each projection 20a can engage a recess 11b formed in the inner circumferential surface of the housing body 11 of FIG. 2. The engagement between the projection 20a and the recess 11b can position the stator core 20 with respect to the motor housing MH. The positioned stator core 20 is fixed to the inner circumferential surface of the housing body 11 by a roll pin (not illustrated).

Because the stator core 20 is configured as described above, the oil scraped up by the rotation of the impeller 38 is evenly discharged to the coil 23 wound around the stator core 20, and the heated coil 23 can be cooled.

The lower section of the housing body 11 constitutes the oil reservoir 51, and the oil can be reserved in the oil reservoir 51 in the lower section of the housing body 11, for example, up to a position of a horizontal line illustrated by a dotted line of FIG. 1. Part of the coil 23 wound around the stator core 20 can be dipped in the oil reserved in the oil reservoir 51 in the lower section of the housing body 11. According to the configuration, the coil 23 is cooled by the oil reserved in the oil reservoir 51 in the lower section of the housing body 11, and the coil 23 is also cooled by the oil scraped up by the impeller 38.

The oil cooling the coil 23 flows down to the lower section of the housing body 11, and the oil is reserved in the oil reservoir 51. A drain port 53 communicated with the outside is formed in the lower section of the housing body 11, and an oil level of the oil reserved in the oil reservoir 51 can be adjusted by a flow rate of the oil discharged from the drain port 53 and a flow rate of the oil supplied from the oil supply opening 11a.

Figure 3:
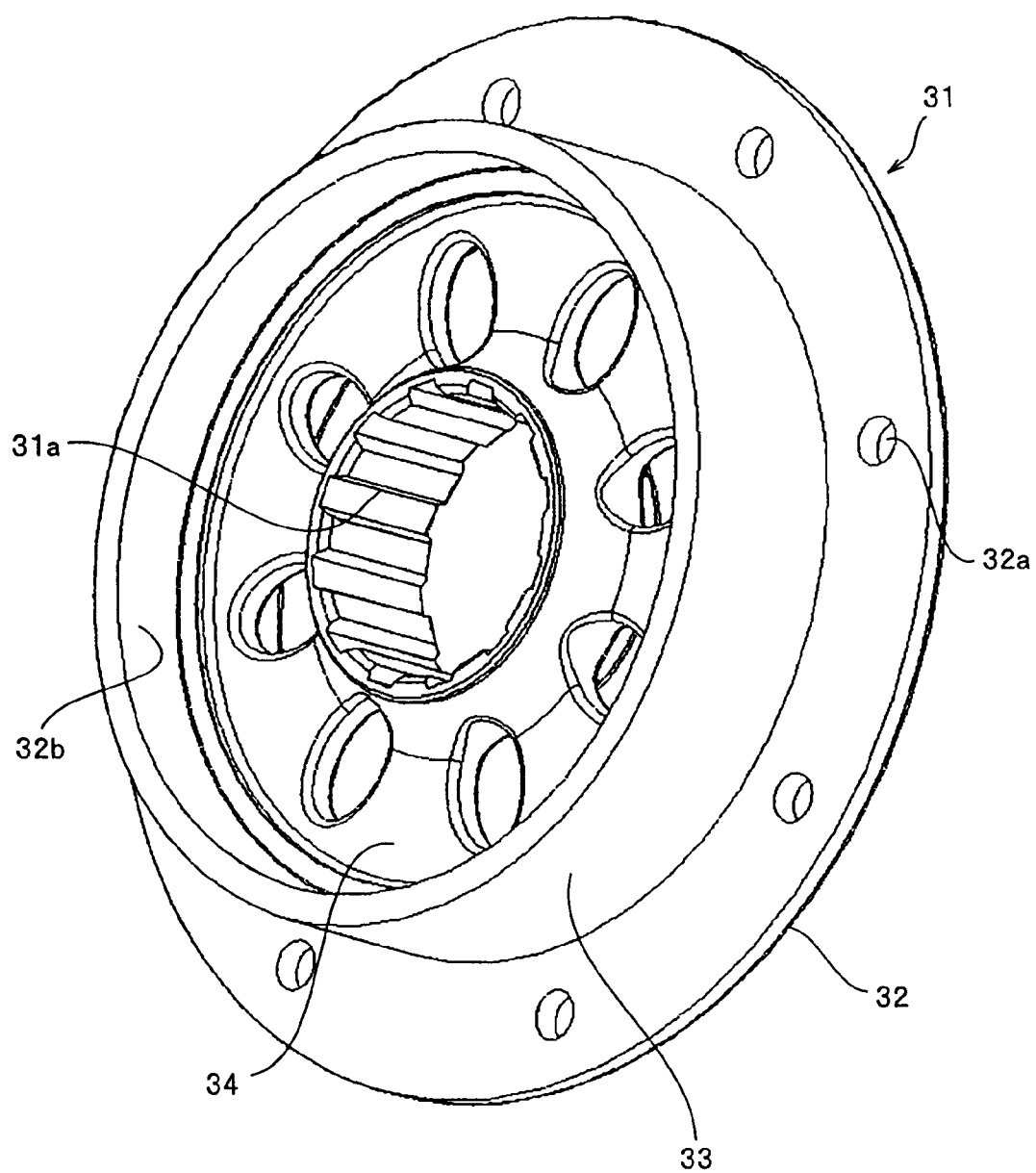
FIG. 3 is a perspective view of a rotor support section when viewed from a pump side (embodiment)
Figure 4:
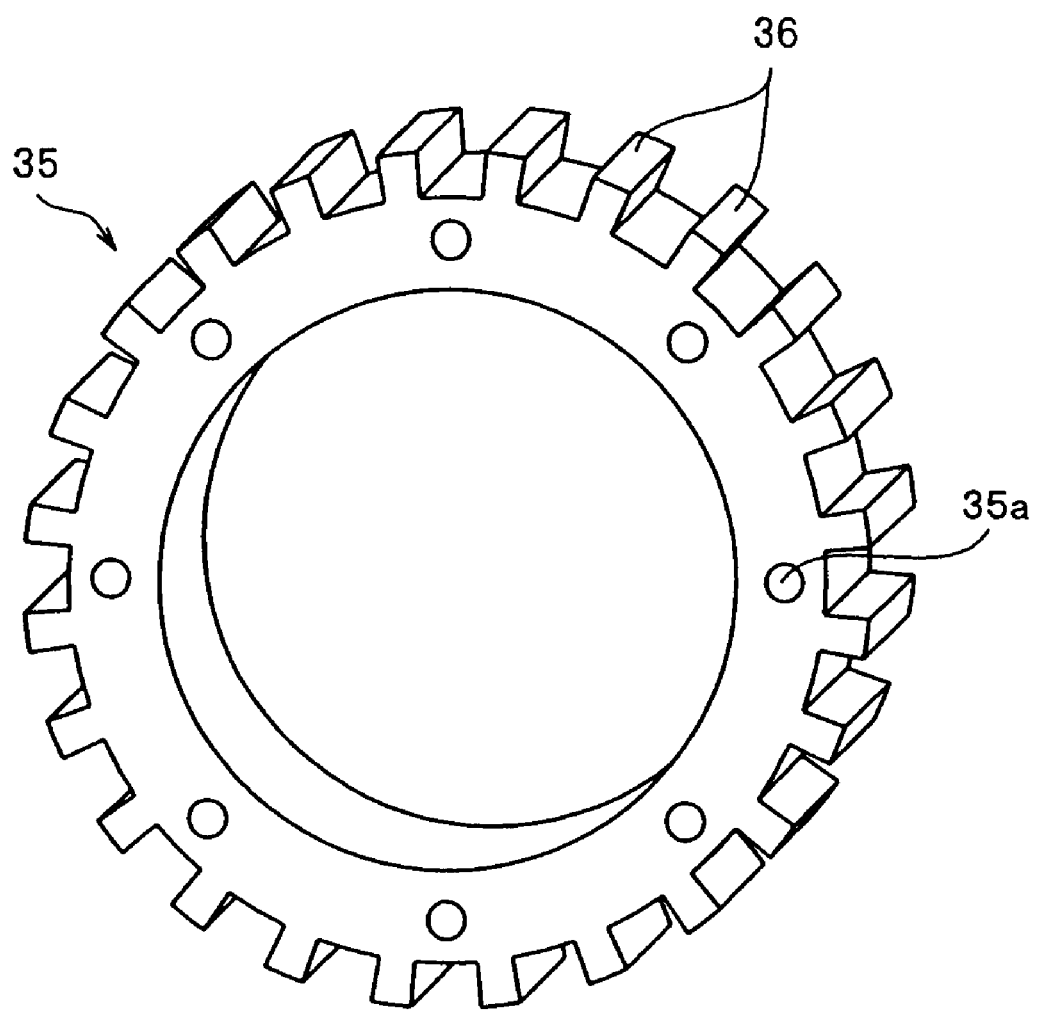
FIG. 4 is a perspective view of a motor rotor (embodiment)

The motor rotor 30 includes the rotor support section 31 of FIG. 3 and the rotor yoke 35 of FIG. 4. As illustrated in FIG. 3, the rotor support section 31 includes an annular disc section 34, a cylindrical support surface 33, and an annular flange section 32. The annular disc section 34 is joined onto the inner circumferential surface side of the cylindrical support surface 33, and an internal spline 31a that engages the second external spline 43 of the connection shaft section 40 is formed in the annular disc section 34.

The cylindrical support surface 33 is joined the annular flange section 32 on one end section side, and the cylindrical support surface 33 can support the inner circumferential surface of the rotor yoke 35. The flange section 32 can support and fix the end face of the rotor yoke 35 and the impeller 38.

The annular disc section 34, the cylindrical support surface 33, and the flange section 32, which constitute the rotor support section 31, can be integrally formed by producing means such as casting.

The rotor yoke 35 and the impeller 38 are fixed by bolts 37a and nuts 37b. The bolts 37a are inserted in a plurality of bolt insertion holes 32a made in the flange section 32 of the rotor support section 31, and the nuts 37b are screwed on the bolts 37a. As illustrated in FIG. 4, a plurality of bolt insertion holes 35a in each of which the bolt 37a is inserted are made in the circumferential direction in the rotor yoke 35 so as to be located in positions corresponding to the bolt insertion holes 32a. As illustrated in FIG. 1, a plurality of bolt insertion holes 38a in each of which the bolt 37a is inserted are also made in the impeller 38.

As illustrated in FIG. 4, many inductors 36 are projected at predetermined pitch in the circumferential direction of the outer circumferential surface of the rotor yoke 35, and the outer circumferential surface of the cylindrical support surface 33 is fitted in and fixed to the inner circumferential surface of the rotor yoke 35.

In the embodiment, as described above, a total of 36 protrusions 21 each of which is protruded from the inner circumferential surface of the stator core 20 to constitute a magnetic pole are provided at equal intervals. On the other hand, a total of 24 inductors 36 formed in the rotor yoke 35 are provided at equal intervals.

As described above, a pitch difference is provided between the number of magnetic poles (protrusions 21) in the stator core 20, that is, the pitch between the magnetic poles (protrusions 21) and the pitch between the inductors 36 in the rotor yoke 35.

The oil passage through which the oil flowing down from the oil supply opening 11*a* formed in the upper wall section of the motor housing MH is supplied to the second spline joint section 82 after supplied to the first spline joint section 81 through the space 54 will specifically be described with reference to FIG. 1.

As illustrated by arrows of FIG. 1, part of the oil flowing down from the oil supply opening 11*a* flows into the space 54 formed between the bearing flange 50 and the pump housing PH through the opening 52 of the bearing flange 50 mounted on the motor housing MH. The oil flowing into the space 54 is supplied to the first spline joint section 81.

As illustrated by arrows, the oil supplied to the first spline joint section 81 can flow in the axis direction of the connection shaft section 40 through the engagement gap between the internal spline 42 of the connection shaft section 40 and the external spline 2*a* of the input shaft 2. At this point, the connection shaft section 40 and the input shaft 2, which are spline-jointed, are rotated, so that the lubricant oil can evenly be supplied in sequence to the teeth of the internal spline 42 and the external spline 2*a*, which engage each other.

The oil evenly lubricating the internal spline 42 and the external spline 2*a* flows into the hole 45. As illustrated by arrows, the oil flowing into the hole 45 flows out toward one end section side of the connection shaft section 40 along the inner circumferential surface of the hole 45 by the centrifugal force of the rotating connection shaft section 40.

Then the oil flowing out onto one end section side of the connection shaft section 40 spreads radially along the end face on one end section side of the connection shaft section 40 by the centrifugal force of the rotating connection shaft section 40. That is, the oil passes through the gap formed between the end face on one end section side of the connection shaft section 40 and the output shaft 1 which faces the end face on one end section side, and the oil is supplied to the second spline joint section 82.

As illustrated by arrows, the oil supplied to the second spline joint section 82 can flow in the axis direction of the connection shaft section 40 through the engagement gap between the first external spline 41 of the connection shaft section 40 and the internal spline 71 of the flywheel 70. The oil that flows out in the axis direction of the connection shaft section 40 after evenly lubricating the second spline joint section 82 becomes mist while colliding with the members in the motor housing MH, and the oil can reach the third spline joint section 83 or the coil 23 of the stator core 20. Then, the oil can lubricate the third spline joint section 83 and cool the coil 23.

As illustrated in FIG. 6, the hole 45 is made on the center axis of the connection shaft section 40, and the hole 45 is made as a through-hole that pierces to the hollow recess 44 in which the internal spline 42 is formed. Counterbore sections 48*a* and 48*b* are formed in both end sections of the internal spline 42. The oil supplied from the space 54 to the first spline joint section 81 can tentatively be reserved in the counterbore section 48*a*, and the oil reserved in the counterbore section 48*a* can always evenly be supplied to the engagement gap between the internal spline 42 and the external spline 2*a*.

The oil passing through the engagement gap between the internal spline 42 and the external spline 2*a* (see FIG. 1) can tentatively be reserved in the counterbore section 48*b* formed in an end section on a deep side of the internal spline 42. The oil reserved in the counterbore section 48*b* moves radially along the sidewall surface of the counterbore section 48*b* by the centrifugal force generated by the rotation of the connection shaft section 40, and the oil flows in the hole 45. The oil flowing into the hole 45, as described above, flows out toward one end section side of the connection shaft section 40 by the centrifugal force generated by the rotation of the connection shaft section 40 while rotating along the inner circumferential surface of the hole 45.

In addition to the configuration of the hole 45 of FIG. 6 made on the center axis of the connection shaft section 40, a plurality of holes 45 can coaxially be formed about the center axis of the connection shaft section 40. At this point, a plurality of coaxially-formed holes 45 can be parallel with the center axis of the connection shaft section 40.

The plurality of holes 45 are formed while inclined with respect to the center axis of the connection shaft section 40, and an opening in an end section of each hole 45 can be inclined so as to come close to the side of the first external spline 41 on one end section side of the connection shaft section 40.

Configurations of modifications of the hole 45 in the connection shaft section 40 will be described with reference to FIGS. 7 to 14. In the modifications of the hole 45 in the connection shaft section 40 of FIGS. 7 and 8, the second external spline 43 are formed like the connection shaft section 40 of FIG. 6. In the modifications of the hole 45 in the connection shaft section 40 of FIGS. 9 to 14, the second external spline 43 is not formed, but the rotor support section 31 is supported by and fixed to the annular flange section 46 formed in the outer circumferential surface of the connection shaft section 40 while the bolt 62 is interposed therebetween as illustrated in FIG. 15.

Figure 7:
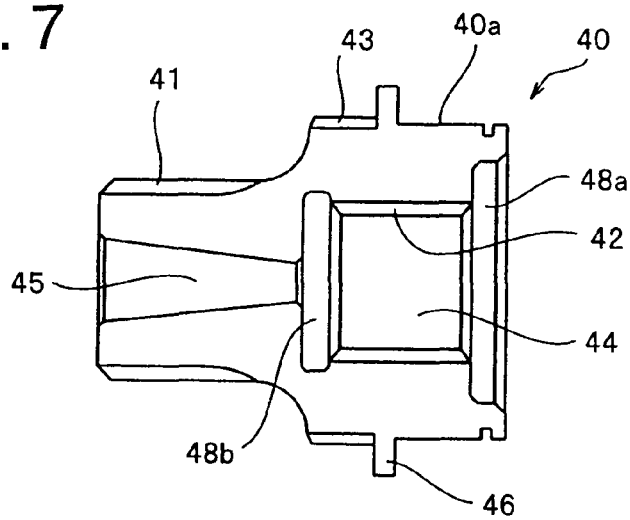
FIG. 7 is a longitudinal sectional view of the connection shaft section illustrating a modification of a hole (embodiment)
Figure 8:
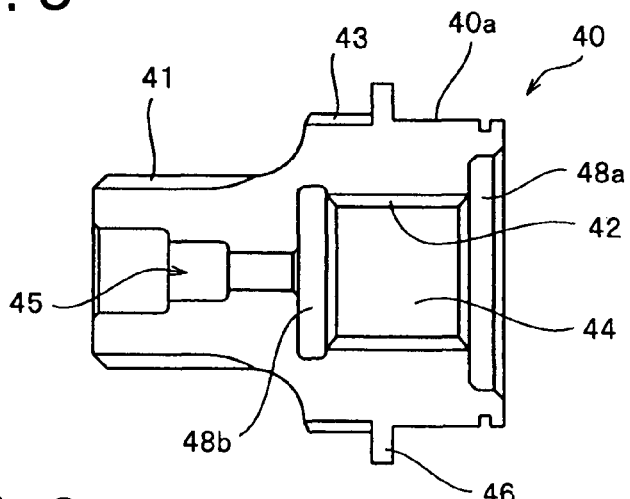
FIG. 8 is a longitudinal sectional view of the connection shaft section illustrating another modification of the hole (embodiment)

Therefore, in the outer circumferential shapes of the connection shaft section 40 of FIGS. 6 to 8, the outer circumferential diameter in which the second external spline 43 and the flange section 46 are formed becomes larger than the outer circumferential diameter in which the first external spline 41 is formed. On the other hand, in the outer circumferential shapes of the connection shaft section 40 of FIGS. 9 to 14, the outer circumferential diameter in which the first external spline 41 is formed is substantially equal to the outer circumferential diameter in which the second external spline 43 and the flange section 46 are formed. This is because the outer circumferential diameter of the connection shaft section 40 can decrease by taking off the second external spline.

Other configurations of the connection shaft section 40 of FIGS. 6 to 14 are similar to one another. In the configurations of the connection shaft section 40 of FIGS. 6 to 14, as to the structure in which the rotor support section 31 is supported and fixed, the second external spline 43 can be formed as illustrated in FIGS. 6 to 8 based on whether the configuration of FIG. 1 or the configuration of FIG. 15 is adopted, or the configuration in which the second external spline 43 is not formed can be adopted as illustrated in FIGS. 9 to 14.

Figure 14:
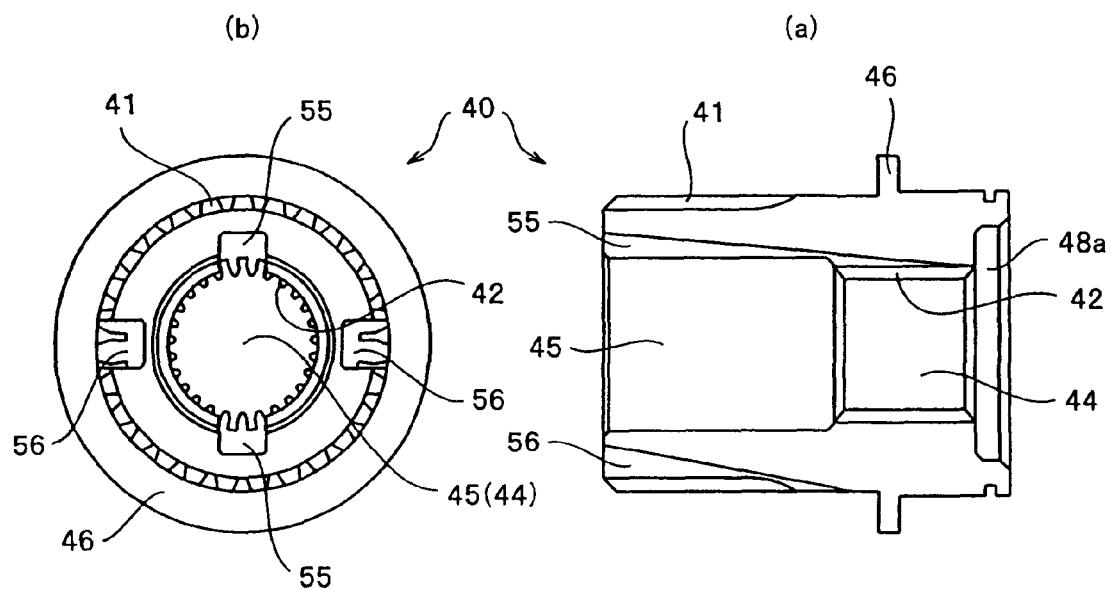
FIG. 14 is a longitudinal sectional view of the connection shaft section illustrating a modification of a second inclined groove (embodiment)
Figure 15:
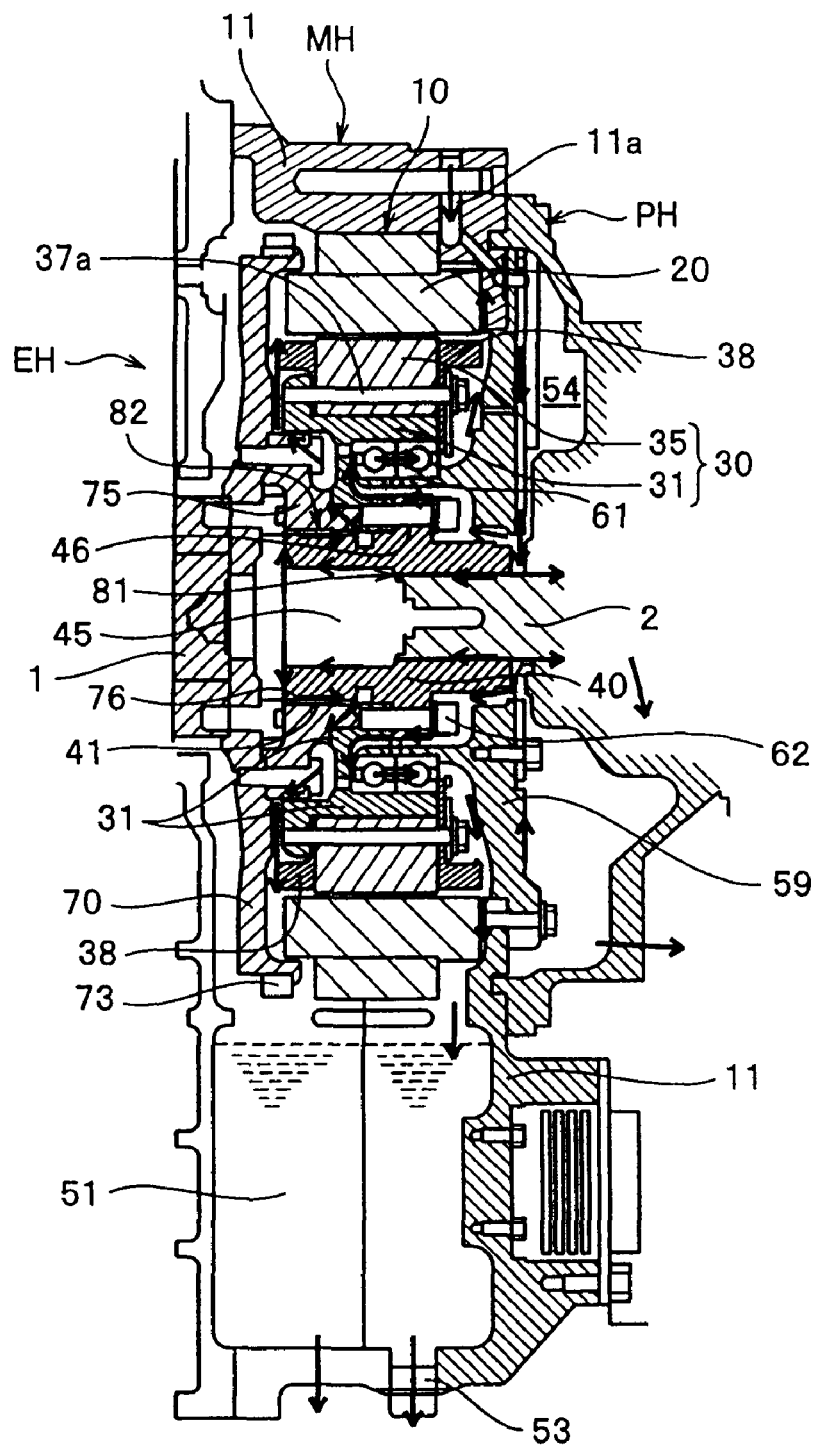
FIG. 15 is a longitudinal sectional view of another generator motor (embodiment)

The modifications of the hole 45 in the connection shaft section 40 of FIGS. 7 to 14 will be described before the configuration of the generator motor 10 of FIG. 15 is described. FIG. 6 illustrates a configuration example in which the hole 45 is made as the straight through-hole in the connection shaft section 40, and FIG. 7 illustrates a configuration in which the hole 45 is made as an inclined hole whose inner diameter expands toward one end section side of the connection shaft section 40.

The action of the centrifugal force obtained by the rotation of the connection shaft section 40 can effectively be utilized by making the hole 45 as the inclined hole, and the oil that flows while rotating along the inner circumferential surface of the hole 45 can flow smoothly toward one end side of the connection shaft section 40. Compared with the shape of the hole 45 of FIG. 6, a larger amount of oil can flow in the shape of the hole 45 of FIG. 7.

Figure 9:
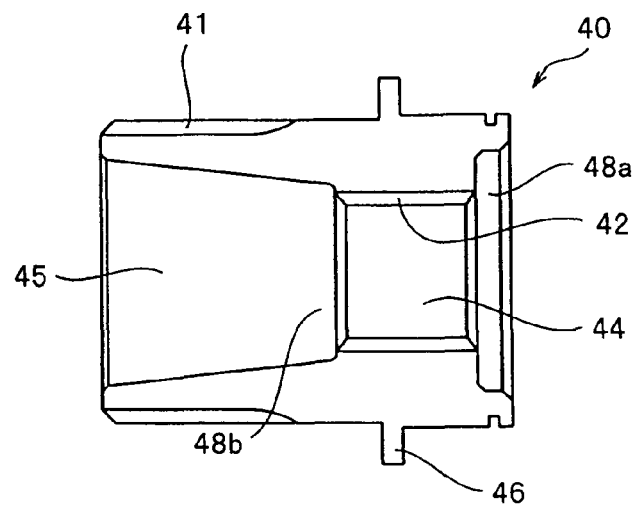
FIG. 9 is a longitudinal sectional view of the connection shaft section illustrating still another modification of the hole (embodiment)

When the hole 45 is made as the inclined hole, as illustrated in FIG. 9, the inner diameter of the hole in a region communicated with the hollow recess 44 is substantially equal to a diameter of a dedendum circle of the internal spline 42.

In the configuration of FIG. 9, compared with the hole 45 of FIG. 7, the hole 45 as the inclined hole can be enlarged, and the centrifugal force acting on the rotating oil can increase. Therefore, a larger amount of oil can flow in the hole 45.

Instead of making the hole 45 as the inclined hole, as illustrated in FIG. 8, the hole includes a plurality of continuous holes having different inner diameters such that the inner diameters gradually increase toward one end section side of the connection shaft section 40.

Therefore, as with the configuration in which the hole 45 is made as the inclined hole whose inner diameter expands as illustrated in FIGS. 7 and 9, a larger amount of oil can flow in the hole 45 by utilizing the centrifugal force. Additionally, the hole 45 includes the plurality of continuous holes having different inner diameters, so that the cutting work of the hole 45 of FIG. 8 can easily be performed at low cost.

Figure 10:
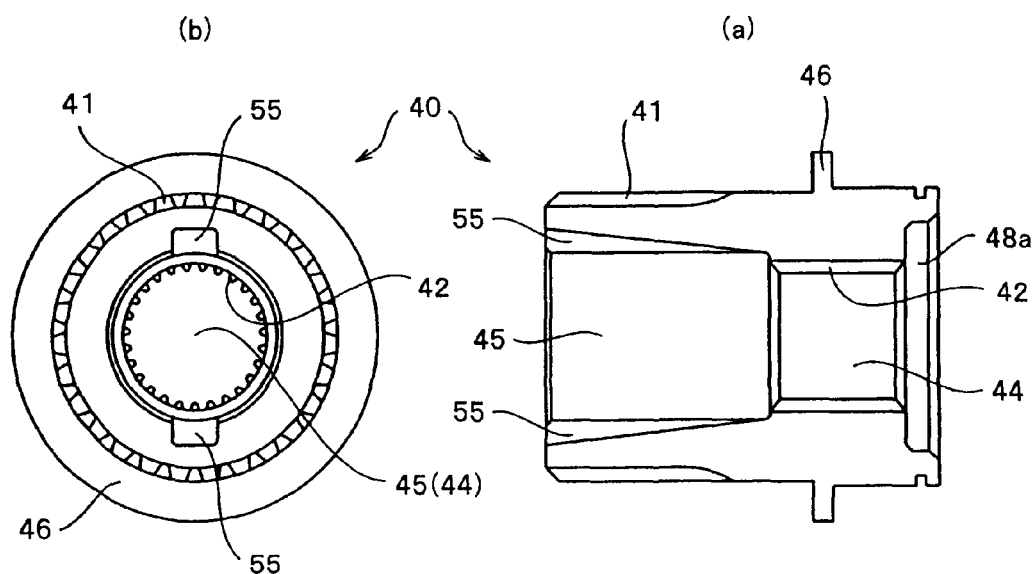
FIG. 10 is a longitudinal sectional view of the connection shaft section in which a first inclined groove is formed in the hole (embodiment)

A configuration of the connection shaft section 40 in which an inclined groove is further added will be described with reference to FIGS. 10 to 14. FIGS. 10(*a*) to 14(*a*) are longitudinal sectional views of the connection shaft section 40, and FIGS. 10(*b*) to 14(*b*) are front views of the connection shaft section 40 when viewed from one end section side.

FIG. 10 illustrates a configuration example in which a pair of first inclined grooves 55 is formed in the inner circumferential surface of the hole 45 made as the drilled hole such that a depth of the groove increases toward one end section side of the connection shaft section 40. Desirably the pair of first inclined grooves 55 is disposed in the regions that are symmetrical in relation to the center axis of the connection shaft section 40 in order not to lose the rotating balance of the connection shaft section 40.

When the plurality of pairs of first inclined grooves 55 are formed in the regions that are symmetrical in relation to the center axis of the connection shaft section 40, desirably the first inclined grooves 55 are provided at equal intervals about the center axis of the connection shaft section 40.

A large proportion of oil flowing along the inner circumferential surface of the hole can flow in the first inclined groove 55 by forming the first inclined groove 55. Additionally, the amount of cutting the connection shaft section 40 to form the first inclined groove 55 is smaller than the amount of cutting the inclined hole of FIGS. 7 and 9 whose inner diameter expands or the amount of cutting the stepped hole of FIG. 8 having the plurality of different diameters.

For example, even if the end face on one side of the connection shaft section 40 does not have the sufficiently large outer diameter, the drilled hole having the small inner diameter can be made as the hole 45, and the amount of oil flowing in the hole 45 can increase without degrading the rigidity of the connection shaft section 40 itself.

Figure 11:
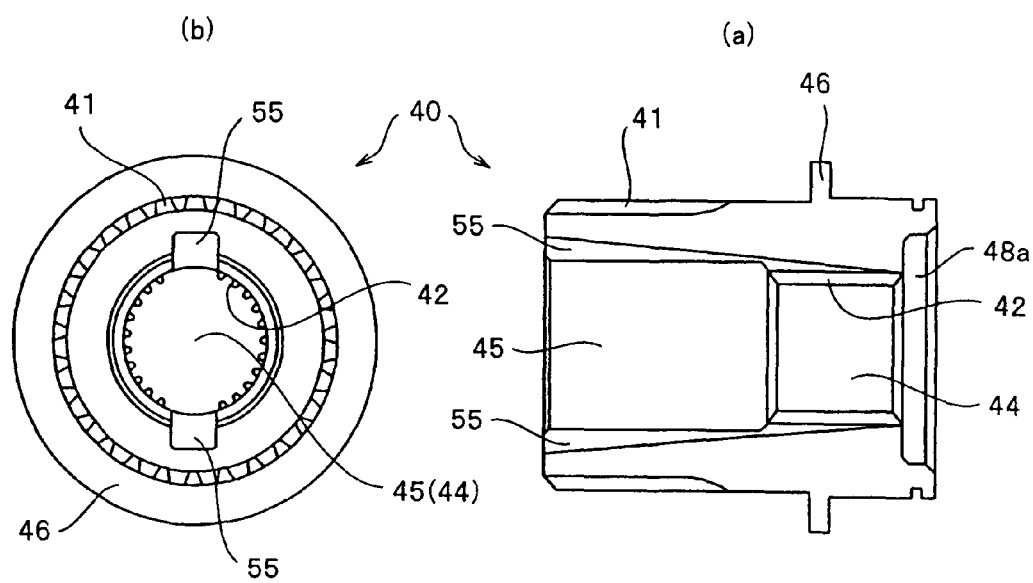
FIG. 11 is a longitudinal sectional view of the connection shaft section illustrating a modification of the first inclined groove (embodiment)
Figure 12:
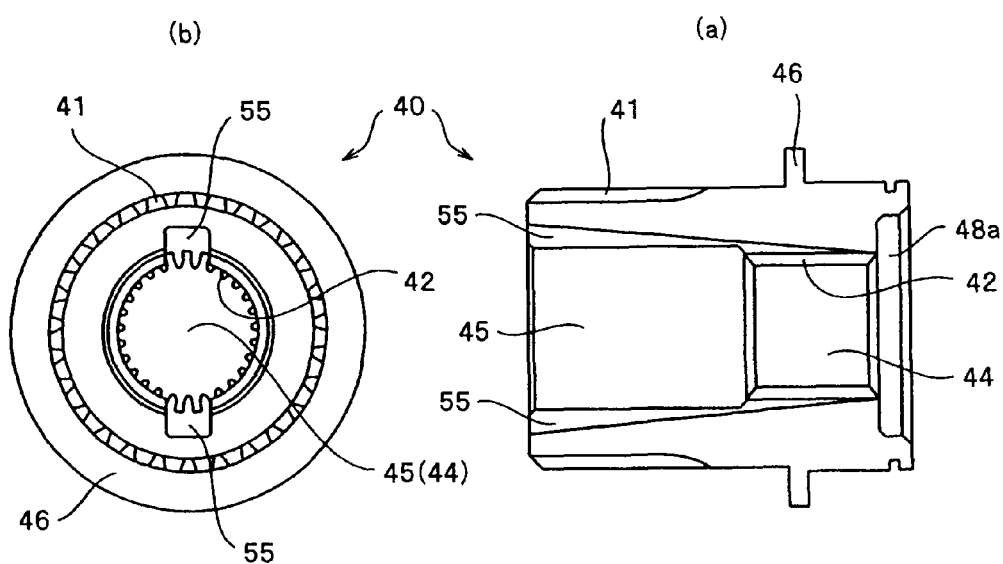
FIG. 12 is a longitudinal sectional view of the connection shaft section illustrating another modification of the first inclined groove (embodiment)

As illustrated in FIGS. 11 and 12, the first inclined groove 55 can also be formed as the inclined groove communicating the end face on one end section side of the connection shaft section 40 to the end face on the other end section side. FIG. 11 illustrates a configuration example in which the first inclined groove 55 is formed into a groove shape in which part of the internal spline 42 is lost in the region where the internal spline 42 is formed. FIG. 12 illustrates a configuration example in which the first inclined groove 55 is formed as an inclined groove having a width identical to the pitch width of the teeth bottom surface in the internal spline 42 in the region where the internal spline 42 is formed.

In the configurations of FIGS. 11 and 12, the action of the centrifugal force can easily act on the oil passing through the first spline joint section 81 on the other end section side of the connection shaft section 40. Therefore, a larger amount of oil can pass through the first spline joint section 81.

Figure 13:
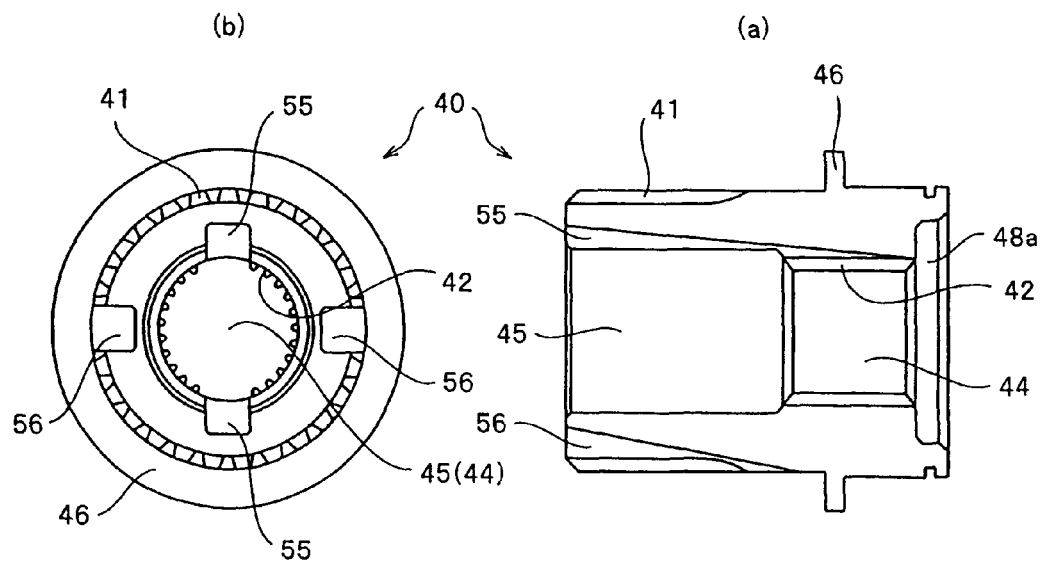
FIG. 13 is a longitudinal sectional view of the connection shaft section in which a second inclined groove is formed in a first external spline (embodiment)

FIGS. 13 and 14 illustrate configuration examples in which, in addition to the first inclined groove 55, a pair of second inclined grooves 56 is formed in the region where the first external spline 41 is formed such that a depth of the groove increases toward one end section side of the connection shaft section 40.

FIGS. 13(*a*) and 14(*a*) illustrate the states in which the second inclined groove 56 in a lower half section is rotated about the center axis of the connection shaft section 40 by 90 degrees.

FIG. 13 illustrates a configuration example in which the second inclined groove 56 is formed into a shape in which part of the first external spline 41 is lost. FIG. 14 illustrates a configuration example in which the second inclined groove 56 is formed as the inclined groove having the width identical to the pitch width in the teeth bottom surface in the first external spline 41.

When the second inclined grooves 56 are formed as illustrated in FIGS. 13 and 14, the oil flows easily in the second spline joint section 82 engaged with the first external spline 41 of the connection shaft section 40 by utilizing the centrifugal force generated by the rotation of the connection shaft section 40, and the oil can evenly lubricate the second spline joint section 82.

Desirably the pair of second inclined grooves 56 is disposed in the regions that are symmetrical in relation to the center axis of the connection shaft section 40 in order not to lose the rotating balance of the connection shaft section 40. When both the first inclined groove 55 and the second inclined groove 56 are formed, for example, the two first inclined grooves 55 can vertically be provided while the two second inclined grooves are horizontally provided as illustrated in FIG. 13(*b*).

Therefore, that the residual thickness on one end section side of the connection shaft section 40 decreases by interference between the pair of first inclined grooves 55 and the pair of second inclined grooves 56 to degrade the rigidity of the connection shaft section 40 itself can be prevented. Additionally, the first inclined grooves 55 and the second inclined grooves 56 can be formed such that the rotating balance of the connection shaft section 40 is not lost.

Another configuration example of the generator motor 10 in which the connection shaft sections 40 of FIGS. 9 to 14 are used will be described with reference to FIG. 15. In the configuration of the generator motor 10 of FIG. 15, the rotor support section 31 is mounted on the connection shaft section 40 with the bolt 62 interposed therebetween. The configuration of the generator motor 10 of FIG. 15 differs from the configuration of the generator motor 10 of FIG. 1 in which the third spline joint section 83 is used.

The configuration changes slightly because the configuration changes to mount the rotor support section 31 on the connection shaft section 40. Additionally, the oil reservoir 51 formed in the bottom section of the motor housing MH is enlarged. Because other configurations are identical to those of the generator motor 10 of FIG. 1, the same component is designated by the same numeral, and the description is omitted.

As illustrated in FIG. 15, a gear member 75 in which an internal spline 76 engaging the first external spline 41 of the connection shaft section 40 is fixed to the flywheel 70 mounted on the output shaft 1. The rotor support section 31 is journaled in the bearing 61 that is supported by the bearing flange 59 fixed to the circumferential side face on the side opposite to the engine side of the motor housing MH.

The rotor support section 31 is fixed to the flange section 46, formed in the outer circumferential surface of the connection shaft section 40, while the bolt 62 is interposed therebetween. The end face on the engine side of the rotor support section 31 abuts on the gear member 75 fixed to the flywheel 70. The movement in the axis direction of the connection shaft section 40 fixing the rotor support section 31 and the rotor support section 31 is controlled by the journal of the bearing 61 and the abutment of the gear member 75.

The oil that flows down from the oil supply opening 11a provided in the upper wall section of the motor housing MH can be supplied from the space 54 to the first spline joint section 81 through the oil passage formed in the sidewall of the motor housing MH. Part of the oil supplied from the space 54 to the first spline joint section 81 can flow into the pump housing PH along the outer circumferential surface of the input shaft 2 to lubricate the bearing journaling the input shaft 2, and the part of the oil can lubricate the bearing 61 through the gap formed between the outer circumferential surface of the connection shaft section 40 and the bearing flange 59.

The oil lubricating the first spline joint section 81 moves along the inner circumferential surface of the hole 45, and the oil can be used to lubricate the second spline joint section 82. The oil lubricating the second spline joint section 82 can be supplied to the rotor yoke 35 through the gap between the rotor support section 31 and the gear member 75 and the flywheel 70.

The impeller 38 is mounted on the end section of the rotor yoke 35, the oil lubricating the second spline joint section 82 and the oil lubricating the bearing 61 from the space 54 are supplied to the impeller 38 to flyby the rotation of the impeller 38, which allows the oil to come down to the protrusions 21 of the stator core 20 to cool the coil 23 (see FIG. 5).

Figure 16:
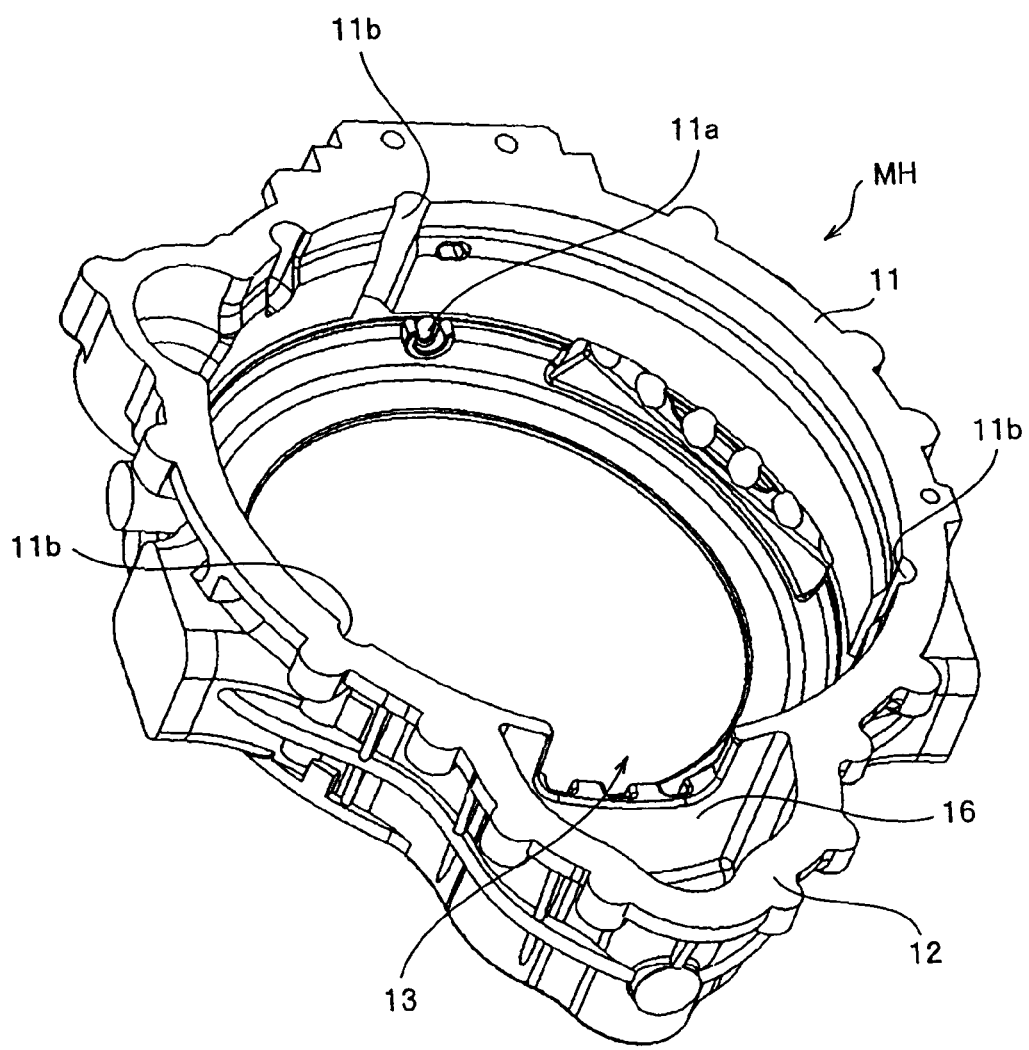
FIG. 16 is a perspective view of the motor housing of FIG. 15 when viewed from the engine side (embodiment)
Figure 17:
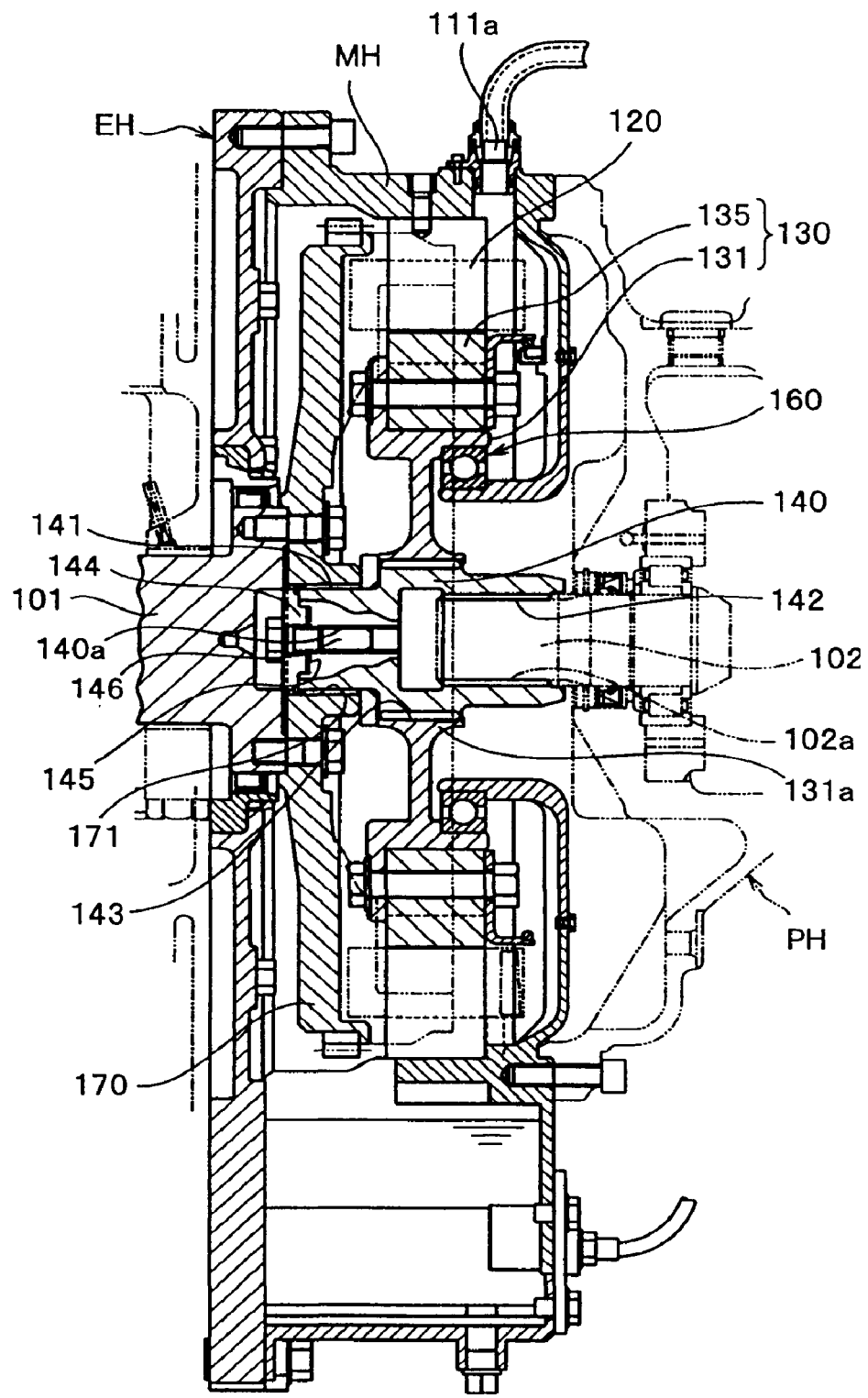
FIG. 17 is a longitudinal sectional view of a generator motor (conventional example).

As illustrated in FIG. 16, in the motor housing MH, the whole of the housing body 11 is formed into a thin cylindrical shape, and a frame section 12 having a reverse isosceles triangular shape is joined to a lower end of the motor housing MH. The lower end section of the housing body 11 and the frame section 12 are partially communicated with each other through a communication passage 13. Both the end face on the engine side of the frame section 12 and the end face on the hydraulic pump side are closed to form the oil reservoir 51 inside.

As illustrated in FIG. 15, after the oil that is supplied from the oil supply opening 11a provided in the upper wall section of the housing body 11 lubricates the first spline joint section 81 and the second spline joint section 82 to cool the protrusions 21 of the stator core 20, the oil flows down in the motor housing MH, and the oil is reserved in the oil reservoir 51.

The oil in the oil reservoir 51 can cool the coil 23 by dipping part of the coil 23 wound around the stator core 20 in the oil reservoir 51. The drain port 53 is formed in the lower section of the oil reservoir 51, and the flow rate of the oil discharged outside from the drain port 53 can be controlled.

The invention claimed is:

1. A power unit comprising:
   a connection shaft section that connects an output shaft of an engine and an input shaft to which a drive force of the output shaft is transmitted;
   a generator motor provided in an outer circumferential section of the connection shaft section, the generator motor including a rotor that rotates integrally with the connection shaft section;
   an external spline that is formed in parallel with a center axis direction of the connection shaft section to form a spline joint with one of the output shaft and the input shaft at an outer circumferential surface on one end section side of the connection shaft section; and
   an internal spline that is formed in parallel with the center axis direction of the connection shaft section to form a spline joint with one of the input shaft and the output shaft at an inner circumferential surface on the other end section side of the connection shaft section,
   wherein the connection shaft section includes a hole that communicates with a hollow recess that forms the internal spline and opens to an end face on the one end section side of the connection shaft section, and
   an oil passage communicating the internal spline with the external spline includes the hole and a gap formed between the end face on the one end section side of the connection shaft section and one of the output shaft and the input shaft.

2. The power unit according to claim 1, wherein the hole is formed as an inclined hole whose inner diameter expands toward the one end section side of the connection shaft section.

3. The power unit according to claim 2, wherein the inner diameter of the hole in a region communicating with the hollow recess is substantially equal to a diameter of a dedendum circle of the internal spline.

4. The power unit according to claim 1, wherein the hole includes a plurality of continuous holes having different inner diameters, and the plurality of continuous holes are made such that the inner diameters gradually increase toward the one end section side of the connection shaft section.

5. The power unit according to any one of claims 1 to 4, wherein at least one first inclined groove is formed in the hole and opens to the end face on the one end section side of the connection shaft section, a depth of the first inclined groove increasing toward the one end section side.

6. The power unit according to claim 4, wherein the first inclined groove is formed as an inclined groove that is communicated with the end face on the other end section side of the connection shaft section.

7. The power unit according to claim 6, wherein a shape of the first inclined groove in a region where the internal spline is formed is formed into the inclined groove having a width identical to a pitch width of the internal spline.

8. The power unit according to any one of claims 1 to 4, wherein at least one second inclined groove is formed in an outer circumferential surface of the connection shaft section in a region where the external spline is formed and opens to the end face on the one end section side of the connection shaft section, a depth of the second inclined groove increasing toward one end section side.

9. The power unit according to claim 8, wherein a shape of the second inclined groove in the region where the external spline is formed is formed into the inclined groove having a width identical to a pitch width of the external spline.

10. The power unit according to claim 5, wherein at least one second inclined groove is formed in an outer circumferential surface of the connection shaft section in a region where the external spline is formed and opens to the end face on the one end section side of the connection shaft section, a depth of the second inclined groove increasing toward one end section side.

11. The power unit according to claim 6, wherein at least one second inclined groove is formed in an outer circumferential surface of the connection shaft section in a region where the external spline is formed and opens to the end face on the one end section side of the connection shaft section, a depth of the second inclined groove increasing toward one end section side.

12. The power unit according to claim 7, wherein at least one second inclined groove is formed in an outer circumferential surface of the connection shaft section in a region where the external spline is formed and opens to the end face on the one end section side of the connection shaft section, a depth of the second inclined groove increasing toward one end section side.

13. The power unit according to claim 10, wherein a shape of the second inclined groove in the region where the external spline is formed is formed into the inclined groove having a width identical to a pitch width of the external spline.

14. The power unit according to claim 11, wherein a shape of the second inclined groove in the region where the external spline is formed is formed into the inclined groove having a width identical to a pitch width of the external spline.

15. The power unit according to claim 12, wherein a shape of the second inclined groove in the region where the external spline is formed is formed into the inclined groove having a width identical to a pitch width of the external spline.

* * * * *